United States Patent
Keller et al.

(10) Patent No.: US 9,398,150 B2
(45) Date of Patent: Jul. 19, 2016

(54) METHOD OF SETTING DETECTION PARAMETERS IN AN APPARATUS FOR ON HOLD MUSIC DETECTION

(71) Applicant: THOMSON LICENSING, Issy de Moulineaux (FR)

(72) Inventors: Anton Werner Keller, Arni (CH); Rolf Guldener, Oetwl Am See (CH); Stefan Dubach, Effingen (CH)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/746,735

(22) Filed: Jun. 22, 2015

(65) Prior Publication Data
US 2015/0373190 A1    Dec. 24, 2015

(30) Foreign Application Priority Data

Jun. 24, 2014    (EP) .................................... 14173680

(51) Int. Cl.
| | | |
|---|---|---|
| *H04M 1/725* | (2006.01) | |
| *H04M 3/428* | (2006.01) | |
| *H04W 4/16* | (2009.01) | |
| *H04M 3/42* | (2006.01) | |
| *G10L 19/018* | (2013.01) | |

(52) U.S. Cl.
CPC ........ *H04M 3/4285* (2013.01); *H04M 1/72558* (2013.01); *H04M 3/4211* (2013.01); *H04W 4/16* (2013.01); *G10L 19/018* (2013.01)

(58) Field of Classification Search
CPC .......... G10L 25/48; H04M 2203/2088; H04M 2203/305; H04M 3/42221; H04M 3/4285; H04M 3/4286
See application file for complete search history.

(56) References Cited

U.S. PATENT DOCUMENTS

| | | | |
|---|---|---|---|
| 4,677,569 | A | 6/1987 | Nakano et al. |
| 6,400,804 | B1 | 6/2002 | Bilder |
| 6,694,012 | B1 | 2/2004 | Posthuma |
| 7,136,479 | B2 | 11/2006 | Gutta et al. |
| 7,403,605 | B1 | 7/2008 | Day |
| 7,881,450 | B1 | 2/2011 | Gentle et al. |
| 8,126,125 | B2 | 2/2012 | Koch |

(Continued)

FOREIGN PATENT DOCUMENTS

| | | |
|---|---|---|
| AU | 644951 B2 | 12/1993 |
| CN | 1801866 | 5/2010 |

(Continued)

OTHER PUBLICATIONS

Scheirer et al: "Construction and Evaluation of a robust multifeature Speech-Music Discriminator";1997;Interval Research Corp., 1801-C Page Mill Road, Palo Alto. CA, 94304 USA; 1997 IEEE, pp. 1331-1334.

(Continued)

*Primary Examiner* — Kashif Siddiqui
(74) *Attorney, Agent, or Firm* — Volpe and Koenig, P.C.

(57) ABSTRACT

A method of setting detection parameters in an apparatus for on-hold music detection, includes comparing a telephone number dialed with telephone numbers in a database. If the telephone number dialed is found in the database, detection parameters and/or detection software associated with the telephone number are retrieved from the database, and the retrieved detection parameters and/or detection software are provided to an on-hold music detection unit.

15 Claims, 3 Drawing Sheets

(56) References Cited

U.S. PATENT DOCUMENTS

| | | |
|---|---|---|
| 8,412,164 B2 | 4/2013 | Lee |
| 8,451,086 B2 | 5/2013 | Petrovic et al. |
| 8,619,965 B1 | 12/2013 | Figa et al. |
| 2003/0235289 A1 | 12/2003 | Gutta et al. |
| 2005/0147227 A1 | 7/2005 | Chervirala et al. |
| 2007/0003045 A1 | 1/2007 | Florkey et al. |
| 2007/0223673 A1 | 9/2007 | Pfleging et al. |
| 2007/0225030 A1 | 9/2007 | Teague |
| 2008/0095385 A1 | 4/2008 | Tourwe et al. |
| 2008/0254774 A1 | 10/2008 | Lee |
| 2009/0136014 A1 | 5/2009 | Bigue et al. |
| 2011/0228914 A1 | 9/2011 | Zourzouvillys et al. |
| 2012/0139726 A1 | 6/2012 | Brunson et al. |
| 2015/0332708 A1* | 11/2015 | Keller ............... G10L 25/48 704/270 |

FOREIGN PATENT DOCUMENTS

| | | |
|---|---|---|
| EP | 1672898 | 6/2006 |
| EP | 1755323 | 2/2007 |
| JP | 4286443 | 10/1992 |
| JP | 2002016695 | 1/2002 |
| WO | WO9909731 | 2/1999 |
| WO | WO2009073035 | 6/2009 |

OTHER PUBLICATIONS

Seyerlehner et al: "Automatic Music Detection in Television Productions"; Proc. of the 10th Int. Conference on Digital Audio Effects (DAFx-07), Bordeaux, France; Sep. 10, 2007; pp. DAFX1-DAFX8. Search Report Dated Nov. 11, 2014.

* cited by examiner

METHOD OF SETTING DETECTION PARAMETERS IN AN APPARATUS FOR ON HOLD MUSIC DETECTION

This application claims the benefit, under 35 U.S.C. §119 of European Patent Application No. 14173680.1, filed Jun. 24, 2014.

FIELD

The present invention relates to communications, and, in particular, to audio content handling in telephone calls placed on-hold.

BACKGROUND

A common telephony feature is placing a user on "hold" or in an "on-hold" state. When a first user places a second user on hold, the connection is maintained while the first users handset is disconnected from the connection. This allows the first user to take another call or step away from the handset. When the hold feature, or state, is enabled, the second user might be connected to another signal source for the receive signal path, such as broadcast news or a prerecorded message. A very common signal source for the on-hold connection is pre-recorded or broadcast music, termed "on-hold music," where music selections are transmitted to the receiver while the connection is in an on-hold state. The music selections are played out at the second user's handset receiver until the on-hold state is terminated.

The second user typically has no means of control over the on-hold music. Some types of on-hold music may be annoying or objectionable. Thus, there is a general desire to replace on-hold music with other content selected by the second user and provided at the second user's side of the connection. This desire has led to the development of various methods and apparatuses allowing for replacing on-hold music in telephone connections.

For example, WO 2009/073035 discloses a wireless telephone handset which, while in an on-hold state, allows a user to select one or more sources for play-out of media at a handset receiver, and then be signaled when the on-hold state is terminated. Detection of on-hold state is done by detecting on-hold music or by receiving an on-hold signaling. The media source is located in the user's handset or accessed through a separate connection established between the handset and the network.

Similarly, U.S. Pat. No. 7,136,479 discloses a replacing on-hold music with audio content from a local source at a telephone receiver. The local audio content is played to a user while on-hold music is detected.

More generally, U.S. Pat. No. 8,412,164 discloses reproducing various kinds of user-selectable data while a user is placed on hold in a telephone connection.

SUMMARY OF THE INVENTION

The detection of on-hold music takes noticeable time. Also, different types of on-hold music are available, e.g. single tone 'synthetic' music, or actual music of different genres, like pop, rock, classic, and the like. This makes the on-hold music detection difficult, as these different types and genres need to be recognized equally well, but each one of the different type or genre of music may require different parameters, methods and/or software for optimal recognition results. Even more different parameter sets, methods and/or software may be required in case the on-hold music is watermarked, since in this case recognizing the watermarks may be preferred over recognizing the music. The same is true when flags or other signals are transmitted for indicating on-hold music. Such flags or signals may be transmitted either in-band, similar to the RDS traffic announcements used in FM radio, or over a dedicated control channel. In each of the cases a detector is provided either at the first party's device, or in the network and in communication with the first party's device. The time required for detection may vary between different types of on-hold music detection.

Recognition is typically performed by a digital signal processor that is provided with a software and parameters for recognizing. It is a well-known fact that a single set of parameters does not provide optimal recognition results for different types of music, different genres of music, and even more so for watermark detection. In order to prevent having to provide processing power, memory, and other elements and components for each conceivable type and genre of music, and for watermark detection, the present invention suggests providing a set of parameters depending on the type or genre of music, or depending on whether or not watermarking is used, that can be expected for a particular telephone number that was dialed.

The invention recognizes that the type or genre of music, or use of watermarks, associated with a particular telephone number, changes only very seldom, if ever. Thus, in accordance with the invention a most appropriate parameter set, or even recognition software, is selected from a database in accordance with the telephone number dialed, and provided to an on-hold recognition unit. The on-hold recognition unit typically includes a digital signal processor, which receives the selected parameter set and/or the software. The database can be updated automatically, e.g. over the internet, or through a learning algorithm, or manually.

The invention also allows for adding telephone numbers dialed for the very first time to the database, and adding appropriate parameter sets and/or software, once a most appropriate parameter set and/or software has been determined.

For example, once a telephone number is dialed, and on-hold music is received, a user can manually trigger a recognition process that tries each of the detection types, for example starting with watermarks and flags. Once a specific type has been detected, the information is stored in the database for later reference. The user interaction can of course be replaced by having the audio signal analysis running permanently, trying to detect on-hold music. Once on-hold music is detected by audio signal analysis, the other methods can be tried for refinement, and the database can be updated based on the result of the analysis.

Generally, determination of parameter sets may be triggered manually, in response to a user input, or automatically, by sequentially trying different parameter sets and/or software while a connection is established.

In order to continually improve the detection of on-hold music for each telephone number, the parameter sets may be adaptively tuned for improving detection. Once an improved parameter set has been found, the improved parameter set is stored for the associated telephone number. The tuning may occur 'live', i.e. while a connection with on-hold music is established, or off-line. For off-line recognition, a portion of the on-hold music detected under the old parameter set is stored and analyzed at a later time.

Determination of parameter sets and/or software may also include obtaining the parameter sets and/or software over a separate data connection. Reception of parameter sets and/or software may be charged separately or may be free of charge.

In case the software and/or parameter set is provided at a charge, the charge may be billed depending on the telephone number. For example, when a particular telephone number is dialed, this number may be associated with a separate data connection, over which the parameter set and/or software is provided. The provision may be effected out-of-band or in-band. Such provision over a separate data connection is particularly useful and simple to implement in IP-based telephone networks, i.e. VoIP networks, which are increasingly replacing conventional telephone networks.

The invention also allows for preventing the detection mechanism to start working for telephone numbers known not to use on-hold music. This reduces the processing load on a user's device and thus reduces the power consumption. Alternatively, the processing load that is not required can be used for processing other tasks which would otherwise have been delayed.

A method of setting detection parameters in an apparatus for on-hold music detection in accordance with one aspect of the invention includes comparing a telephone number dialed with telephone numbers in a database. If the telephone number dialed is found in the database, detection parameters for the telephone number are retrieved from the database, and provided to an on-hold music detection unit.

Detection of on-hold music can be performed in a telephone device at a first party's side, which is the party that is placed on hold, or in a detector located in the network, in between the first and a second party, which detector has at least listener-access to the connection, and which has some control over the connection for replacing the on-hold music.

Likewise the database may be located in the telephone device at the first party's side, or remote.

Access to the database and/or the on-hold music detection unit for retrieving parameters and/or software or for providing the parameters and/or the software to the on-hold music detection unit can be established by use of known networking technologies. These known networking technologies include in-band signaling, e.g. using DTMF keys, or out-of-band signaling, e.g. over a separate data connection of generally known type.

In an embodiment of the invention the parameters configure the on-hold music detection unit to perform audio signal analysis.

In a development of the previous embodiment the audio signal analysis is configured to adaptively self-learn. In accordance with the self-learning the signal analysis parameters are modified during or after a previous telephone connection, for which on-hold music detection was performed, in order to improve the speed, accuracy and/or reliability of on-hold music detection. Once an improved parameter set has been determined, the improved parameter set is stored for the associated telephone number.

The process of adaptively self-learning can be executed while the telephone connection and the on-hold music is active, or can be executed after the telephone connection is terminated. In the latter case at least a portion of on-hold music recognized under the previous parameter set is stored, and accessed later for the self-learning process. The stored portion may also be sent to a device remote from the user's device, for performing the parameter extraction, and only the parameters are received for storage and subsequent use after the processing is terminated.

If a telephone number has been dialed for the very first time, the on-hold music detecting unit may operate under an initial parameter set, and may subsequently perform the parameter set optimization in one of the ways described before. In this context it is also possible to record, in response to a user command, passages containing on-hold music, or even the entire communication, for subsequent off-line determination of a parameter set. Once the parameters for this new telephone number are determined both are associated and stored in the database.

The adaptive self-learning process may also be executed based on an initial parameter set selected by a user, corresponding to a type of on-hold music, or to on-hold music detection by watermarking.

Alternatively, the adaptive self-learning may sequentially try each one of a number of detection methods and/or parameter sets, and select the one that performed best.

Judging the software and/or parameter set that performed best may be done automatically, e.g. in accordance with preset thresholds, or in response to a user input.

As stated further above different types of on-hold music require different parameters and/or software or algorithms for best recognition results. Schreiner/Slaney, in "Construction and evaluation of a robust multifeature Speech/Music discriminator", Interval Research Cor., Palo Alto Calif., and Seyerlehner/Pohle/Schedl/Widmer in "Automatic Music Detection in Television Productions", 2007, Kepler University, Austria, name many different features of an audio sequence that can be extracted and analyzed to classify an audio sequence. Examples of audio features are: 4 Hz modulation energy, Percentage of "Low-Energy" Frames, Spectral Roll-Off Point, Spectral Centroid, Spectral "Flux", Spectral Entropy, Zero-Crossing Rate, Cepstrum Resynthesis Residual Magnitude, Pulse metric, Linear predictive Coefficients etc.

Often for a successful detection several features are analyzed in parallel using different respective methods. In accordance with an aspect of the invention it is preferable to start with the method identified to provide best results for each individual feature when analyzing a phone call. I.e., in case of various features being analyzed simultaneously, different parameter sets and/or software types may be used simultaneously, each parameter or software having previously been identified as best suited for a particular feature.

The methods mentioned before have significantly different requirements for the analysis of the audio sequences. This results in different segment analysis window lengths, detection thresholds etc. for an analysis.

"Pulse metric" uses long-time filtered autocorrelations to determine the amount of rhythm in a window having a duration of several seconds and detects a strong, driving beat, e.g. techno, salsa, rock music, in the signal. In comparison "Low-Energy" Frames are usually detected by RMS of an audio sequence having a duration of around one second.

The best available/optimized parameters for the used methods are stored in the database for priming the next detection process with the best possible values for a fast detection. Also, as stated before, the parameters may further be optimized during the next detection process.

S/N ratio or a specific noise pattern may be a property of the waiting-queue music used, periods of silence and voice communication. Using known values for these parameters will speed-up the detection process.

As each genre of the waiting-queue music has its own specific pattern, e.g. techno, blues, pop, synthesizer music, storing the genre predominantly used in on-hold music for a specific phone number enables making a proper choice of method and parameters.

Similarly, transitions between voice and music or music and voice, e.g. silence, clicks, noise, etc. may be characteristic for a particular telephone number. Such transitions can be detected quickly and are good indicators of the beginning and/or end of on-hold music.

It is obvious that the reliability of the detecting process is important to the user, since a user will not use a feature that fools him/her regularly. The supervision of each number and the detection process is important. A simple measure of the reliability is tracking the number of manually triggered interruptions of the replacement of the waiting-queue music by the user. A phone number for which manual interrupts are recorded repeatedly is checked in the list and stronger methods and parameters may be applied for detection.

Very often, voice announcements are interspersed in the on-hold music, i.e. interrupt the music. This can disturb the on-hold music detection and lead to unwanted interruptions in the reproduction replacing content, notably in case the interspersed announcements provide no additional information or value to the party on hold. Such announcements include, inter alia, generic or standard voice announcements like "please hold the line", "the service agent will be with you momentarily, thank you for your patience", or "all lines are busy, please wait". This type of announcement can be assigned to a group of first type voice announcements, which can be ignored in the context of the present invention.

Telephone numbers associated with such type of voice announcements can re-prime the recognition mechanism once the initial music recognition has successfully recognized on-hold music.

In all aspects of the present invention the functional detection blocks may be implemented by a software program running on a general microprocessor, or on a dedicated audio processor, e.g. implemented in an ASIC or an FPGA, or a combination thereof. Nevertheless, all or parts of the functional blocks may also be implemented by dedicated hardware.

It will be readily apparent to the skilled person that the aspects, embodiments and variants described hereinbefore can be combined in various ways.

The present invention can be incorporated into many types of communication systems, e.g. conventional telephone systems, cellular telephone systems, VOIP telephone systems, videoconferencing systems and radio communications systems.

The present invention also includes a data storage device for non-transitory storing program instructions that, when executed on a system as described hereinbefore, perform one or more aspects of the inventive method described further above.

BRIEF DESCRIPTION OF THE DRAWINGS

In the following the invention will be described with reference to the attached drawings, in which.

DESCRIPTION OF EMBODIMENTS

Figure 1:
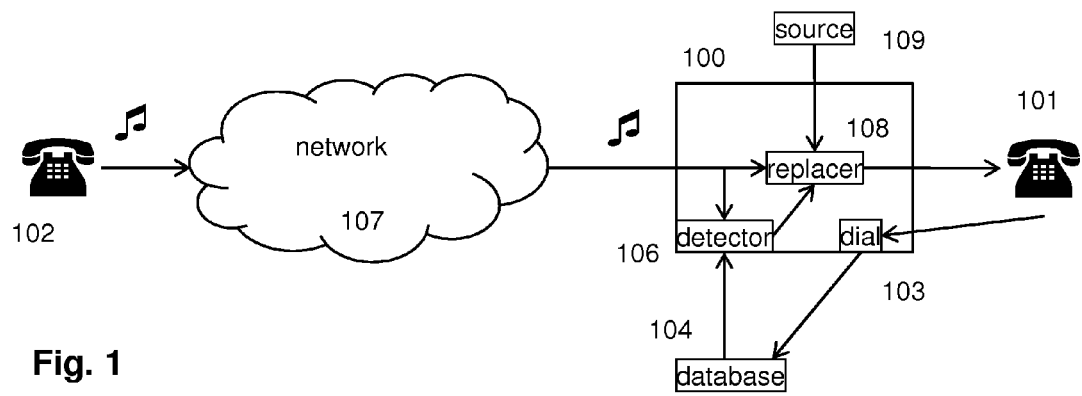
FIG. 1 shows a first exemplary and schematic system in accordance with a first aspect of the invention.

FIG. 1 shows a first exemplary and schematic system in accordance with a first aspect of the invention. At the same time, FIG. 1 provides an indication of the message and control flow of a method in accordance with the first aspect of the invention.

A first party, represented by telephone symbol 101, calls a second party, represented by telephone symbol 102. The dialed telephone number is detected or recognized by dialed number recognition module 103. Depending on the telephone system used, numbers are dialed using pulse trains, DTMF, digital signaling or the like. The way numbers are dialed is irrelevant for the invention; it is only important that the dialed number is made available for the method. Unlike as shown in the figure, telephone 101 and on-hold music detection and replacing apparatus 100 can be integrated in a single device. In such case the dialed telephone number obviously is readily available for use in accordance with the inventive method.

Once the dialed telephone number is available, the telephone number is searched for in database 104, which stores on-hold music recognition parameters and/or software associated with telephone numbers. Database 104 can be integrated in the apparatus, or can be attached separately, e.g. via a local network including USB, Firewire, LAN networks and the like. If the dialed telephone number is found in database 104, database 104 provides according on-hold music recognition parameters and/or software to on-hold music detector 106. On-hold music detector 106 listens to the voice signal transmitted over network 107. In the figure, second party 102 transmits on-hold music, indicated by the music keys, while first party 101 is placed on hold. It is irrelevant whether the on-hold music originates at the second party's side or is injected anywhere in network 107.

On-hold music detector 106 controls replacer 108 depending on whether or not on-hold music has been detected so as to replace on-hold music with other content from content source 109. Like database 104 content source 109 can be integrated in the apparatus, or can be attached separately, e.g. via a local network including USB, Firewire, LAN networks and the like, or via an analog audio/video connection.

Figure 2:
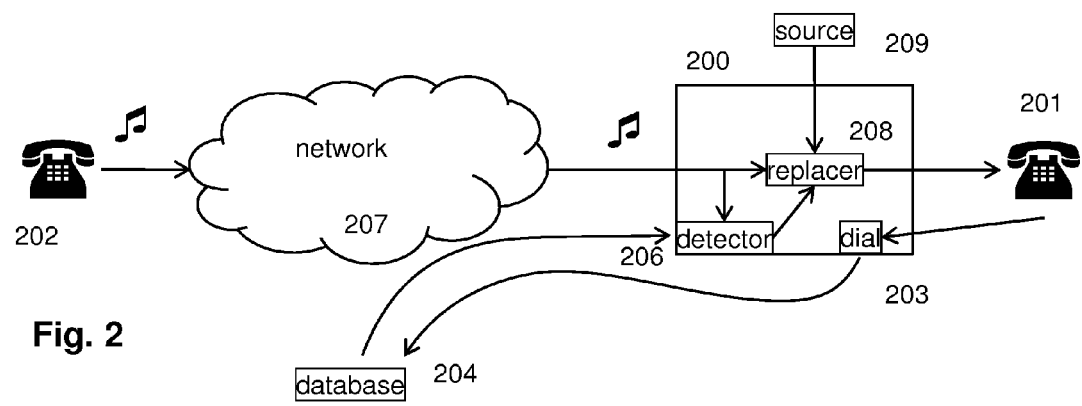
FIG. 2 shows a second exemplary and schematic system in accordance with a second aspect of the invention.

FIG. 2 shows a second exemplary and schematic system in accordance with a second aspect of the invention. Like FIG. 1 FIG. 2 also provides an indication of the message and control flow of a method in accordance with the second aspect of the invention.

The system of FIG. 2 differs from the one discussed with reference to FIG. 1 in that database 204 is located remote from the first party's on-hold music detection and replacing apparatus 200. Database 204 may be located anywhere in the network. The dialed telephone number is transmitted to remote database 204 by dialed number recognition module 203. Transmission may be done for example in-band, using DTMF tones, or out-of-band over a separate data connection. If the dialed telephone number is found in database 204, database 204 provides on-hold music recognition parameters and/or software to on-hold music detector 206. Again, this transmission can be done in-band or out-of-band.

Generally, and applicable to each aspect described in the present specification, in case a voice over IP, or VoIP telephone system is used, an out-of-band transmission of data simple requires sending some additional data packets over an established connection, or in parallel to the established connection using a separate logical connection.

The remaining elements and functions of the system of FIG. 2 correspond to those described in FIG. 1.

Figure 3:
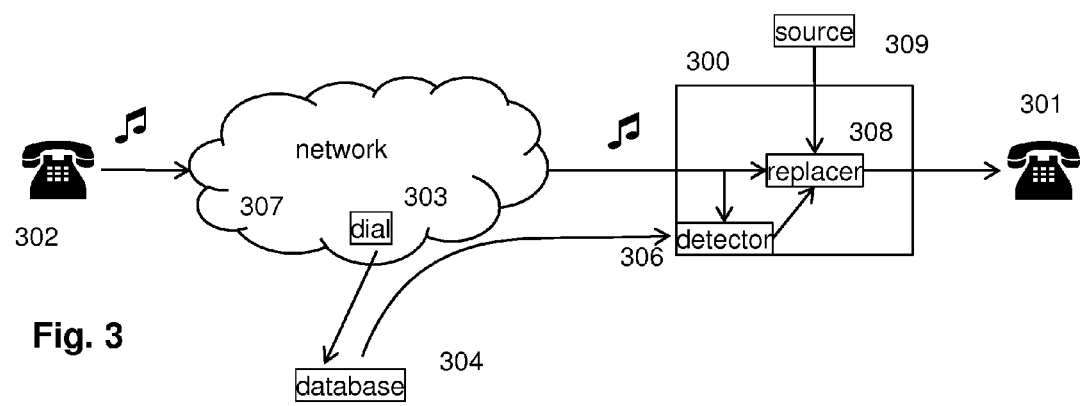
FIG. 3 shows a third exemplary and schematic system in accordance with a third aspect of the invention.

FIG. 3 shows a third exemplary and schematic system in accordance with a third aspect of the invention. Like FIGS. 1 and 2 FIG. 3 also provides an indication of the message and control flow of a method in accordance with the third aspect of the invention.

The system of FIG. 3 differs from the one discussed with reference to FIG. 2 in that dialed number recognition module 303 is located remote from the first party's on-hold music detection and replacing apparatus 300. Dialed number recognition module 303 may be located anywhere in the network, or may be an integral part of the network; it is obvious that an exchange, or a central office, needs to have knowledge of a dialed telephone number for establishing a telephone connection. When database 304 is also located in the network, or is closely attached thereto, the dialed telephone number is transmitted directly from network 307 to database 304, which in turn provides on-hold music recognition parameters and/or software to on-hold music detector 306. Like described in FIG. 2, this transmission can be done in-band or out-of-band.

The remaining elements and functions of the system of FIG. 3 correspond to those described in FIG. 1 or FIG. 2.

Figure 4:
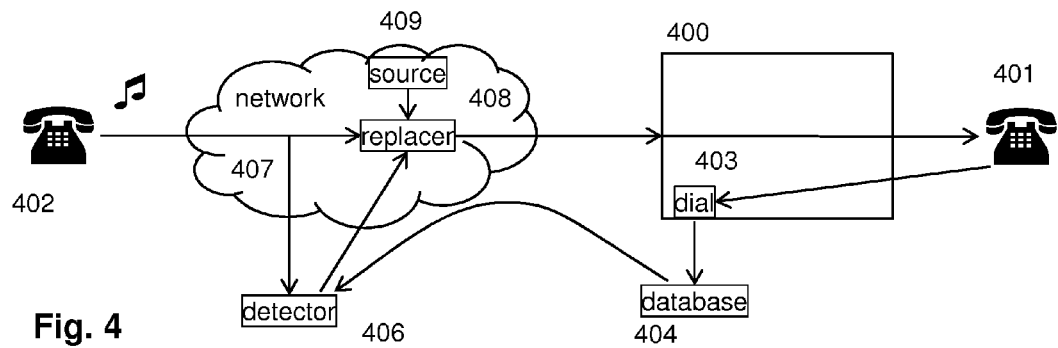
FIG. 4 shows a fourth exemplary and schematic system in accordance with a fourth aspect of the invention.

FIG. 4 shows a fourth exemplary and schematic system in accordance with a fourth aspect of the invention. Like FIGS. 1 to 3 FIG. 4 also provides an indication of the message and control flow of a method in accordance with the fourth aspect of the invention.

In the system of FIG. 4 replacer 408 is located in the network, as is content source 409. Dialed number recognition module 403 is located at the first party's premises and provides the dialed number to database 404, likewise located at the first party's premises. Like in examples described further above, database 404 can be integrated in the apparatus, or can be attached separately, e.g. via a local network including USB, Firewire, LAN networks and the like. If the dialed telephone number is found in database 404, database 404 provides according on-hold music recognition parameters and/or software to on-hold music detector 406. On-hold music detector 406 is located in the network, has listener-access to the communication between the first and the second party, and controls replacer 408 to replace on-hold music with audio/video content retrieved from content source 409. The type of content used for replacing on-hold music may be preset by the first party, or controlled on a per-call basis. Such control is possible for example through in-band signaling using DTMF tones, or out-of-band signaling in the manner described further above with respect to a related function.

Figure 5:
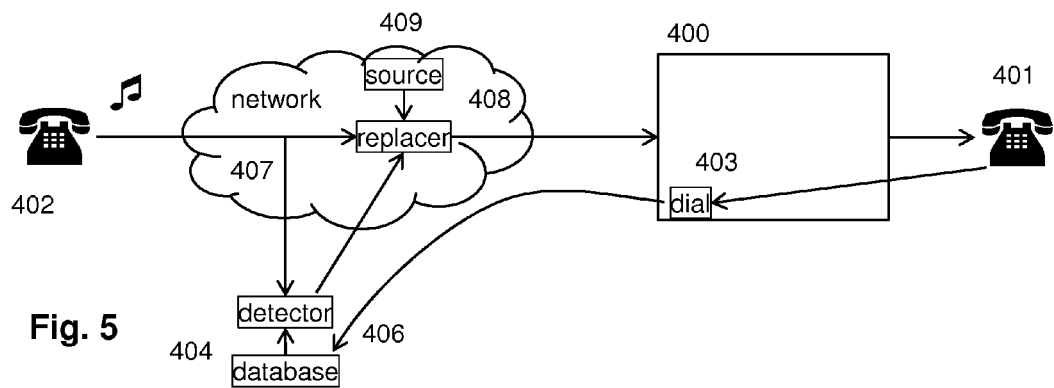
FIG. 5 shows a fifth exemplary and schematic system in accordance with a fifth aspect of the invention.

FIG. 5 shows a fifth exemplary and schematic system in accordance with a fifth aspect of the invention. Like FIGS. 1 to 4 FIG. 4 also provides an indication of the message and control flow of a method in accordance with the fifth aspect of the invention.

The system of FIG. 5 differs from the one discussed with reference to FIG. 4 in that database 504 is located remote from the first party's premises. The only function performed at the first party's premises is recognition of the dialed number in dialed number recognition module 503, and control over the content replacing the on-hold music (not shown in the figure).

Figure 6:
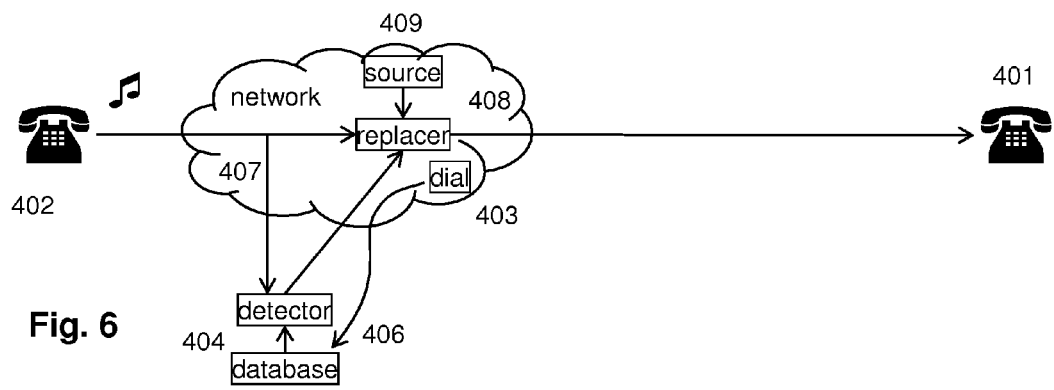
FIG. 6 shows a sixth exemplary and schematic system in accordance with a sixth aspect of the invention.

FIG. 6 shows a sixth exemplary and schematic system in accordance with a sixth aspect of the invention. Like FIGS. 1 to 5 FIG. 6 also provides an indication of the message and control flow of a method in accordance with the sixth aspect of the invention.

In the system of FIG. 6 all essential elements are located remote from the first party's premises. The only function performed at the first party's premises is control over the content replacing the on-hold music (not shown in the figure).

The dialed telephone number is provided to the database from the network, in a manner as described with reference to FIG. 3. The remaining function is very similar to the one described with reference to FIG. 4: If the dialed telephone number is found in database 604, database 604 provides according on-hold music recognition parameters and/or software to on-hold music detector 606. On-hold music detector 606 is located in the network, has listener-access to the communication between the first and the second party, and controls replacer 608 to replace on-hold music with audio/video content retrieved from content source 609. The type of content used for replacing on-hold music may be preset by the first party, or controlled on a per-call basis. Such control is possible for example through in-band signaling using DTMF tones, or out-of-band signaling in the manner described further above with respect to a related function.

Figure 7:
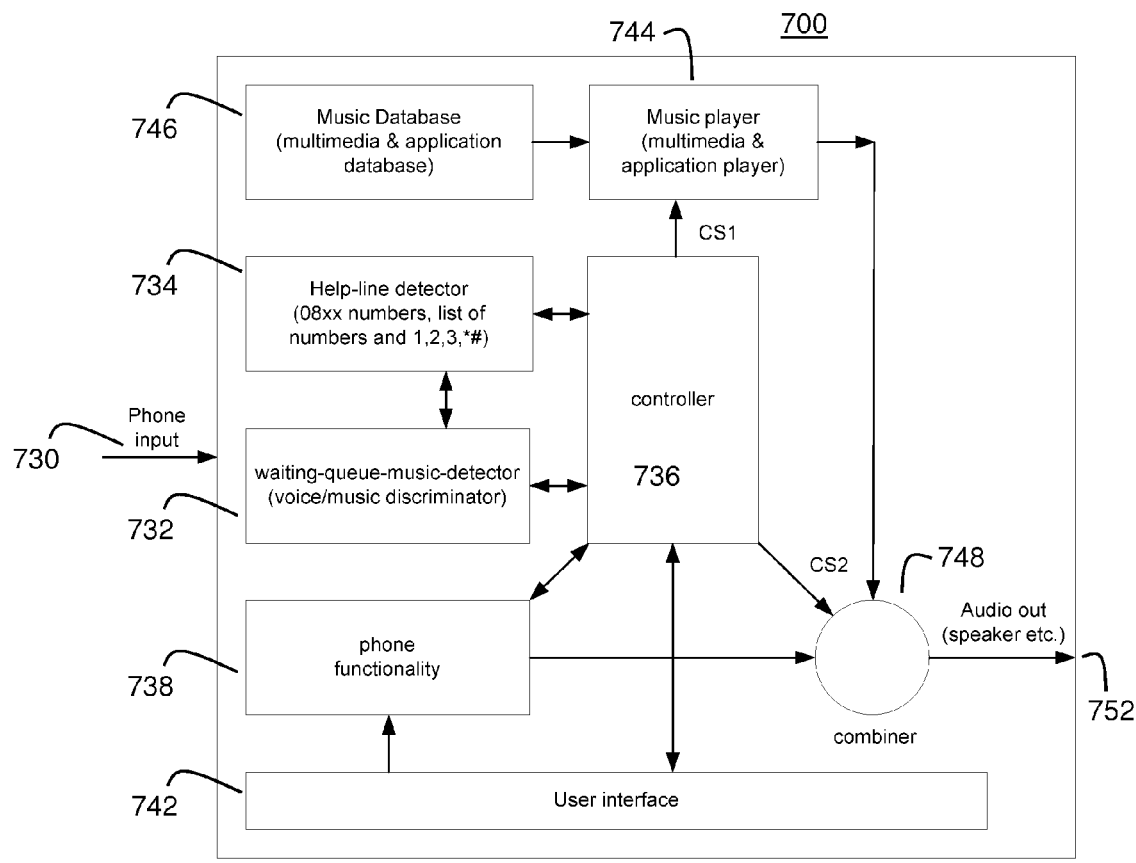
FIG. 7 shows an exemplary block diagram of a first party's device in accordance with the invention.

FIG. 7 shows an exemplary block diagram of a first party's device 700 in accordance with the invention. Input 730 receives the audio signal, including one or more of on-hold music, announcements, and conversation. Block 732 performs on-hold music detection, e.g. by audio signal analysis, using the parameters and/or software provided in accordance with the dialed telephone number. Block 732 is in connection with block 734, which selects or primes the on-hold music detection block based on a telephone number dialed, e.g. sets filter parameters for on-hold music detection, or selects one of the various ways for on hold music detection, i.e. watermark, flag, or audio signal analysis. Blocks 732 and 734 are connected to controller 736, which is also connected to block 738, providing general phone functions, and user interface block 742. User interface block 742 is also connected to block 738. Controller 736 controls music player block 744, which is in connection with content database 746. Music player block 746 may be part of a mobile phone, but may also include any source of content attached to the first party's device. Combiner 748 selects and/or combines audio signals received from phone function block 738 and music player block 744, respectively, under control of controller 736, and provides an audio signal to output 752.

Figure 8:
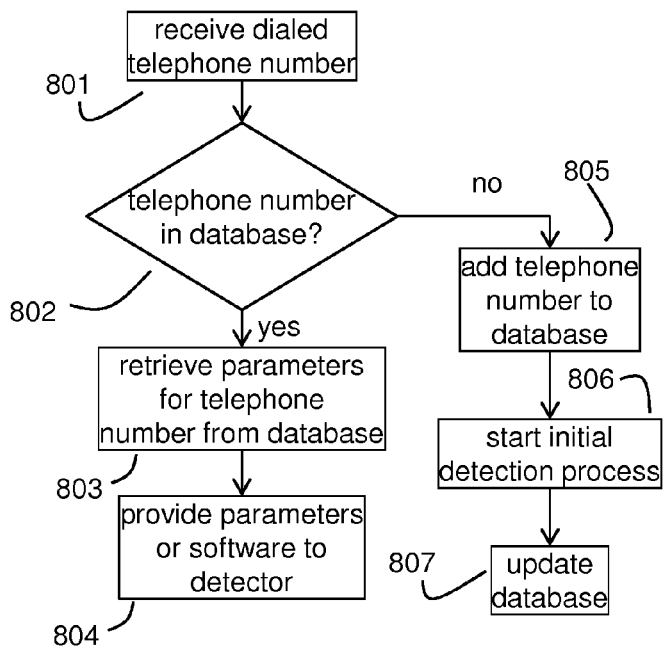
FIG. 8 shows a flow diagram of a method in accordance with the invention.

FIG. 8 shows a flow diagram of a method in accordance with the invention. In step 801 a dialed telephone number is received, and the dialed telephone number is looked up in a database in step 802. If the dialed telephone number is found in the database, 'yes'-branch of step 802, on-hold music recognition parameters and/or software for use by an on-hold music detector, which are stored in the database in connection with the telephone number, are retrieved from the database, step 803. The retrieved parameters and/or software is then provided to the on-hold music detector in step 804, which performs on-hold music detection and replacement accordingly (not shown).

If the dialed telephone number is not found in the database, 'no'-branch of step 802, the dialed telephone number is added to the database in step 805, and an initial detection process is started in order to perform on-hold music detection, step 806. If on-hold music is detected, information about the most appropriate detection mechanism, parameters, and/or software is stored in the database for the telephone number, step 807. Likewise, if no on-hold music was detected for any reason, such information may also be stored in the database. Optionally, in the latter case the stored information may include initial parameters and/or software, or an according flag, for triggering the initial detection process in case the telephone number is dialed again at a later time. Alternatively, the stored information may include a flag indicating that no on-hold music detection is to be performed for this telephone number.

Manual interventions such as user pre-selected parameters and/or software are not shown in the figure, but are also encompassed by embodiments of the invention. Likewise, manual activation of the detection and/or database update process are not shown in the figure, but are also encompassed by embodiments of the invention.

The invention claimed is:

1. A method of controlling an apparatus that replaces on-hold music in a telephone connection with other content from a content source, including:
   receiving a dialed telephone number;
   comparing the dialed telephone number with telephone numbers stored in a database;
   if the dialed telephone number is found in the database, retrieving one or more of at least one detection parameter and a detection software associated with the telephone number from the database, wherein the at least one detection parameter and the detection software is optimized for detecting properties of the on-hold music expected to be received from the dialed telephone number, thereby reducing the processing power required for performing on-hold music detection;
   providing the one or more of the at least one retrieved detection parameter and the detection software to an on-hold music detection unit;
   performing on-hold music detection in the on-hold music detection unit; and
   replacing on-hold music with other content provided by the content source.

2. The method of claim 1, wherein the one or more of the at least one detection parameter and the detection software configure the on-hold music detection unit to perform an audio signal analysis.

3. The method of claim 1, wherein the one or more of the at least one detection parameter and the detection software configure the on-hold music detection unit to perform a watermark detection.

4. The method of claim 1, wherein one or more of comparing and retrieving includes accessing a local database in a user's device or a remote database over a separate data connection.

5. The method of claim 2, wherein the audio signal analysis is adaptively self-learning, and wherein signal analysis parameters modified during a previous on-hold music detection are updated in the database.

6. The method of claim 5, wherein a telephone number previously not associated with on-hold music is added to the database after the adaptive self-learning audio signal analysis performed in the on-hold music detection unit has identified on-hold music.

7. The method of claim 6, wherein the adaptive self-learning audio signal analysis is initialized with an initial detection parameter set and/or detection software.

8. The method of claim 7, wherein the initial detection parameter set and/or detection software is selected based upon a user input indicating one of a plurality of detection methods and/or on-hold music types.

9. The method of claim 8, wherein the adaptive self-learning audio signal analysis includes sequentially applying each one of the plurality of detection methods, using respective initial detection parameter sets and/or detection software, and selecting the method that performed best.

10. The method of claim 1, wherein detecting on-hold music is performed in a detector located in a network over which the telephone connection between a first party and a second party is routed, further including:
    providing, from the first party to the detector, a signal associated with one or more of the at least one detection parameter and the detection software to be used for the detection.

11. The method of claim 10, wherein the database is located in the network, and wherein providing a signal associated with one or more of the at least one detection parameter and the detection software includes transmitting the dialed telephone number, or enabling access of the detector to the network for obtaining the dialed telephone number from the network.

12. The method of claim 10, wherein the database is located at the first party's premises, and wherein providing a signal associated with one or more of the at least one detection parameter and the detection software includes transmitting a signal for selecting one or more of the at least one detection parameter and the detection software stored in the network in a manner accessible by the detector.

13. The method of claim 10, wherein the database is located at the first party's premises, and wherein providing a signal associated with one or more of the at least one detection parameter and the detection software includes transmitting one or more of the at least one detection parameter and the detection software from a storage located at the first party's premises.

14. A system including a telephone, an on-hold music detector, a database storing telephone numbers and one or more of at least one detection parameter and a detection software, wherein the system is adapted to perform the method of claim 1.

15. A non-transitory data storage including program instructions which, when executed on a system causes the system to perform the method of claim 1.

* * * * *